(12) United States Patent
Fenn et al.

(10) Patent No.: US 8,148,451 B2
(45) Date of Patent: Apr. 3, 2012

(54) PRODUCTION OF STABLE WATER DISPERSION EPOXY PHOSPHATE ESTER RESINS AND THEIR AQUEOUS COATING COMPOSITIONS

(76) Inventors: William V. Fenn, Wheaton, IL (US); Richard A. Elsner, Jr., Darien, IL (US); Lei Zhao, Naperville, IL (US)

( * ) Notice: Subject to any disclaimer, the term of this patent is extended or adjusted under 35 U.S.C. 154(b) by 207 days.

(21) Appl. No.: 12/070,481

(22) Filed: Feb. 19, 2008

(65) Prior Publication Data

US 2008/0200588 A1   Aug. 21, 2008

Related U.S. Application Data

(60) Provisional application No. 60/902,212, filed on Feb. 20, 2007.

(51) Int. Cl.
*C08K 3/20* (2006.01)
*C08G 79/02* (2006.01)

(52) U.S. Cl. ........................ 523/402; 528/398
(58) Field of Classification Search .................... 523/402
See application file for complete search history.

(56) References Cited

U.S. PATENT DOCUMENTS

| | | | | |
|---|---|---|---|---|
| 4,164,487 A | * | 8/1979 | Martin | 523/403 |
| 4,289,812 A | * | 9/1981 | Martin | 427/379 |
| 4,331,574 A | | 5/1982 | Bekooij et al. | 525/530 |
| 4,397,970 A | | 8/1983 | Campbell et al. | 523/402 |
| 4,461,857 A | | 7/1984 | Sekmakas et al. | 523/414 |
| 4,497,946 A | | 2/1985 | Sekmakas et al. | 528/99 |
| 4,598,109 A | | 7/1986 | Sekmakas et al. | 523/414 |
| 4,613,661 A | | 9/1986 | Langer et al. | 528/108 |
| 4,692,484 A | * | 9/1987 | Roberts | 523/414 |
| 5,389,704 A | * | 2/1995 | Yabu | 523/406 |
| 7,087,663 B2 | | 8/2006 | Feola et al. | 523/403 |
| 2004/0077801 A1 | * | 4/2004 | Feola et al. | 525/523 |

OTHER PUBLICATIONS

Epoxy Resins; Polymer Science Learning Ctr; Univ of Southern Mississippi; 2003.
Guide to Composites Epoxy Resins; NetComposites, Sequence = 11.

* cited by examiner

*Primary Examiner* — Mark Eashoo
*Assistant Examiner* — David Karst
(74) *Attorney, Agent, or Firm* — Amin Talati, LLC; Paul L. Brown

(57) ABSTRACT

The present invention relates to novel compositions uniquely comprising combinations of different grades and/or type of epoxy resins and phosphoric acid into stable, water dispersion, epoxy phosphate ester copolymers. Aqueous thermosetting coating compositions, based on the novel epoxy phosphate ester resins, have the ability to reduce the requirements of curing temperature and time. The resultant coating films have superior protective properties, film properties, and wider applications than the conventional epoxy phosphate ester resins.

18 Claims, No Drawings

PRODUCTION OF STABLE WATER DISPERSION EPOXY PHOSPHATE ESTER RESINS AND THEIR AQUEOUS COATING COMPOSITIONS

CROSS REFERENCE TO RELATED PATENT APPLICATION

This application claims priority to provisional patent application No. 60/902,212 filed in the United States Patent Office on Feb. 20, 2007.

FIELD OF THE INVENTION

The present invention relates to aqueous, epoxy phosphate ester resin coatings having low volatile organic compounds (VOC) and to a process for their preparation and usage which provides better water dispersion stability and superior film forming properties.

BACKGROUND OF THE INVENTION

Epoxy resins have been used in a wide variety of applications, for example, as primers for metals because of their superiority in corrosion resistance, chemical resistance and flexibility. Similarly, the corrosion-inhibiting effect of phosphoric acid has been well-known for a long time. The combination of epoxy and phosphoric acid into one resin system is also not novel. However, the water-dispersible property of epoxy phosphate ester resin has pointed to a new direction to make more environmental friendly coating products, such as water-based epoxy phosphate ester coating materials, commonly referred to low VOC epoxy phosphate ester resins. Since then, more and more epoxy phosphate ester coating resins have been reported, for example, U.S. Pat. No. 4,289,812 for a general background of such a teaching.

The preparations of epoxy phosphate ester resins have been disclosed in U.S. Pat. Nos. 4,164,487, 4,331,574 and 4,397,970 from late 70s to early 80s. Accordingly, many attempts have been made to balance between the hydrophobic and hydrophilic portions of polymer molecules in order to achieve the better water-dispersability and coating properties. Investigations are still being focused on two major areas: the first area is the ratio of phosphoric acid to the epoxy resin which can cause defects in the coating, and the second is the water solubility and the dispersion stability of the epoxy phosphate ester resins. For example, U.S. Pat. No. 5,389,704 indicates that the unreacted phosphoric acid remaining in the resin product causes defects of the coating film, such as blushing of the resultant coating. Additionally, Japanese Patent Publication Gazette No. Hei 1-055,299 teaches a process of preparing a water-dispersible epoxy phosphate ester resin. However, the resultant resins have unduly large particle size and poor water dispersion stability.

Specifically, the prior art epoxy phosphate ester resins have provided the general guideline of the ratio of phosphoric acid to the oxirane groups. To balance the hydrophobic portion and hydrophilic portion directly affects water-dispersibility, stability and coating properties. The hydrophilicity is usually measured by acid value (acid number). A resin with either too high or too low acid value can affect its water dispersibility, emulsion stability and final coating properties. In the case of such high molecular weight epoxy phosphate ester resins for example, the prior art suggested the acid value of epoxy phosphate ester resin should not be below 20. Otherwise, the water-dispersibility and aqueous stability of such resin become to a major issue.

Currently, commercially available epoxy phosphate ester resins for coatings are the solution type and the emulsion type. The solution type is a product of epoxy resin and phosphoric acid in an organic solvent or solvents. When an epoxy phosphate ester resin has been neutralized and dispersed into water, the resultant product is the well-known emulsion type. The advantage of the solution type method is that it provides coating formulations having the flexibility to select co-reactants even though such materials are hydrophobic in nature. However, the VOC requirements for such coatings demand that the non-volatile weight (NVW) of such solutions be within the range of 65-70% by weight. Needless to say, such resin coating systems have failed to address the need for continuously reduction of VOC contents to meet environmental concerns.

The viscosity of a high-solid (60% or higher) solution of high molecular weight epoxies with or without phosphorization, have been beyond any meaningful measurement. This has prevented the handling of such products on a production scale at room temperature or at elevated temperatures, which has resulted in limited usefulness and a high waste rate. Thus, the high cost of such coating formulations has prohibited their wide use in the industry.

Additionally, because of the high level of phosphate present in the resin system relative to the epoxide groups, the acidity of phosphate functions as a catalyst in combination with the high molecular weight epoxy and has resulted in coating compositions which gelled and sealed faster than the organic polymer. Accordingly, it was difficult to obtain dry film thickness without blistering of the coating film. See, for example, U.S. Pat. No. 7,087,663, wherein without the proper ratio of phosphoric acid and epoxy group, the uncontrolled increase in the degree of polymerization of the formed epoxy resin provides high molecular weight resins, which results in the gelation of the batch and an unusable resin coating material. This is the reason why the production of the epoxy-phosphoric acid adducts is so difficult. Thus, in view of the inadequacies of the prior works, it would be highly desirable to develop epoxy phosphate ester based resins which possess (a) lower amounts of organic solvent, (b) good water-thinnability and dispersible stability, and (c) superior coating properties.

SUMMARY OF THE INVENTION

The object of the present invention is to provide a method and process for preparing aqueous coating compositions in which the film forming components comprise salified epoxy phosphoric acid resin or resins, which have good water-thinnability and stability. The coating composition based on this resin provided a high degree of gloss, excellent film which has excellent corrosion-resistance and film properties. These coating products also fulfill the following requirements:
1. can be used on clear and pigmented finished products;
2. can be applied on various substrates, such as pretreated or untreated cold rolled steel, galvanized steel, template and aluminum;
3. good adhesive and physical properties;
4. reducing film thickness and maintaining the super protective properties; and
5. reducing VOC to meet increasing environmental standards.

In the present invention, there is provided a process for the preparation of an epoxy-phosphoric acid resin, which comprises:
   a) selecting an epoxy resin containing an average of greater than one vicinal epoxy group; and b) reacting a combination of at least one or more different types and/or grades of epoxy resins with a phosphoric acid source material to produce an epoxy phosphate ester resin adduct.

Additionally, the present invention relates to a coating composition comprising:

(1) an epoxy-phosphoric acid adducts obtained by reacting an epoxy resin having an average of greater than one vicinal epoxy group with phosphoric acid to produce an epoxy resin adduct;

(2) at least one curing agent; and water and/or an organic solvent.

The present invention provides epoxy phosphate ester resins containing minimum levels of free phosphoric acid and minimum levels of diesters and triesters of phosphoric acid. The epoxy phosphate ester resin adducts in accordance with the present invention preferably use the combinations of the different grades and/or types of epoxy resins to overcome deficiencies of the individual epoxy resins. Accordingly, the epoxy resin of the present invention can be used to form stable water-borne coating compositions which provide film coatings possessing superior physical properties and corrosion resistance.

DETAILED DESCRIPTION OF THE INVENTION

In the present invention, a process for the production of an epoxy phosphate ester polymer requires as a starting material an epoxy resin containing an average of greater than one vicinal or oxirane epoxy group. This epoxy resin material is reacted with a source of phosphoric acid to yield an epoxy phosphate ester resin adduct.

Suitable epoxy resins useful in the present invention is the diglycidyl ether of the dihydric phenol and, is preferably, the diglycidyl ether or 2,2-bis(4-hydroxyphenyl) propane (DDP) for an example; the general formula of such a diglycidyl ether is

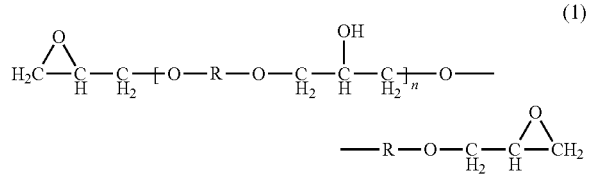

(1)

and any epoxy resins with general structure

(2)

wherein R represents cyclic, acyclic, aromatic and aliphatic groups and n is 0 to 9.

The commercially available solid epoxy resins are often referred to different grades, such as, 1001, 1004, 1007 and 1009 with average weight per epoxide (WPE) from 500 to 3250, and different types, such as, aromatic and aliphatic based epoxy resins with mono- and multi epoxy-functional groups. Another important grade of epoxy resin is the so-called standard liquid epoxy resin having a WPE of 190. Each type of epoxy resins has its own chemical physical properties and has been widely used on different areas in coating industries. In some higher molecular weight bisphenol A epoxy resins, the amount of epoxy groups present is so small the resins are really just polyfunctional alcohols, commonly referred to as phenoxy resins.

It is important to recognize each grade and type of epoxy resin influences the physical and chemical properties of the resultant coated film. In order to overcome the deficiencies of prior epoxy phosphate ester products and maximized the protective properties of epoxy resins, novel combined different grades and/or types of epoxy resins have been developed and demonstrate excellent coating properties. In the present invention, epoxy resins having an average of greater than 1.5 vicinal or oxirane epoxy group can be used. Suitable epoxy resins include those having a weight per epoxy of from 170 to 3500 and, preferably, from 190 to 2500. Suitable epoxy resins include those having a weight average molecular weight of from 340 to 10,000 and, preferably, a weight average molecular weight of from 340 to 5000. The preferred epoxy resins are not only limited to epoxide-terminated, linear epoxy resins having difunctionalitiy, but also include epoxy resins having multi-functionalities. Particularly preferred difunctional epoxy resins are the diglycidyl ethers of bisphenols such as bisphenol A, bisphenol F, bisphenol S, aliphatic phenols. Such epoxy resins are widely available under the trade designation "Epon (Trademark of the Shell Chemical Company)" and "DER (Trademark of the Dow Chemical Company)", such as, for example, "Epon 828", "Epon 1001", "Epon 1004", or "Epon 1007". The epoxy resins in accordance with the present invention are not limited to the combinations of the same kind of dihydric phenol (R) epoxy resins, but include any combinations of any types of epoxy resins. In addition, the suitable epoxy resins include all known epoxy resins having at least an epoxy equivalency of from 1.5 or more.

In the present invention, the epoxy resins which react with phosphoric acid, preferably, are a combination of at least two or more different grades and/or types of epoxy resins. The amount of each epoxy component is between 1 and 99 weight percent.

For the phosphoric acid source, orthophosphoric acid is conventionally supplied as an 85% solution which is widely commercially available. However, suitable phosphoric acids, for example, may include phosphoric acid, polyphosphoric acid, superphosphoric acid, other condensed forms of phosphoric acid, aqueous solutions containing at least 20% $H_3PO_4$, and more preferably from 75% to 115%, and combinations thereof.

In the reaction between the above mentioned epoxy component and the above mentioned phosphoric acid, the acid is provided in an amount of about 0.1-1 equivalent of phosphoric acid per equivalent of epoxy resin (i.e. 0.1-1 P—OH groups per oxirane) and, preferably, about 0.2~0.5. The phosphoric acid performs both as a reactant with the epoxy resin and as a catalyst for the reaction between the epoxy resin and the hydroxyl functional compound.

For the reaction of epoxy resins with the phosphoric acid, the phosphoric acid may be added over a period of time from 5 to 150 minutes. However, it is preferred to be added over a time period of 30 to 90 minutes at a temperature of between 50° C. to 150° C. After the addition of the acid is completed, the reaction mixture heated for 1 to 3 hours, or until a constant WPE is obtained.

The phosphate groups existing on the end of formed molecules enhance the corrosion resistance of the resultant coating film. As stated above, the phosphoric acid moiety may catalyze the process of curing, and provide a coating of a greater degree of adhesion to ferric substrates. Another important reason is that this reaction results in the formation of the monophosphate ester, which has a lower viscosity. Thus, it is necessary to convert di-phosphate and tri-phosphate esters to the monophosphate ester by hydrolysis. The amount of water should not exceed 40 equivalents based on a mole of the acid (as $H_3PO_4$) and, preferably, should not exceed 25 equivalents based on a mole of the acid.

In the present invention, a certain amount of organic solvents is needed in the process of epoxy phosphate esters formation to prevent the gelatin of the reaction mixture and maintain the viscosity within a workable range. The non-volatiles concentration of the reaction system is, preferably, from 50 to 100% based on the total weight of the reaction solvents mixtures. In other words, the weight percentage of organic solvents is from 0-50% by weight. Suitable solvents for use herein include organic solvents having good compatibility of epoxy resins and a boiling point range from 110 to 200° C. Examples of organic solvents used herein are glycol type solvents such as ethylene glycol and propylene glycol; glycol monoether type solvents such as ethylene glycol monoethyl ether, ethylene glycol monobutyl ether, propylene glycol butyl ether, diethylene glycol butyl ether, dipropylene glycol methyl ether; alcohol type solvents such as n-butanol, amyl alcohol; acetate type solvents such as ethylene glycol monomethyl ether acetate; ketone and aromatic type solvents such as diisobutyl ketone and xylene. The above solvents can be used as a single organic solvent or a mixture of two or more thereof in the process. The glycol and monoether type solvents are the most preferred among these solvents.

Only neutralized epoxy phosphoric acid adducts will be water-thinnable materials. Examples of bases used to neutralize the acid are metal hydroxide (i.e. inorganic bases) such as sodium hydroxide, potassium hydroxide, calcium hydroxide, and iron oxide or hydroxide; nitrogen bases such as ammonium hydroxide, ammonia; and organic bases. Organic bases may include:

a) aliphatic mono- and polyfunctional amines, such as n-butyl amine, diethyl amine, trimethyl amine, diethylenetriamine, n-hexylamine, ethylene diamine, allyl amine;
b) choline and guanidine;
c) cycloaliphatic amines, such as cyclohexyl amine, pyrrolidine;
d) aromatic amines, such as aniline, N,N-dimethyl aniline, diaminobenzenes;
e) heterocyclic amines, such as piperazine, morpholine, pyrrolidine, pyridine, hexamethyletumine; and
f) alkanolamines and alkylalkanol amines, such as ethanolamine, dimethylaminoethanol, diethylaminoethanol, diisopropanolamine, triisopropanolamine, 4-hydroxy-n-butylamine, 2-dimethylamine, 2-methyl, 1-propanol, etc.

The coating compositions can be applied by any conventional method on a wide variety of substrates. Therefore, spraying, rolling dipping or electrodeposition applications can be employed for both pigmented and unpigments films.

EXAMPLES

The following examples are intended to illustrate the present invention, but it is understood that these are set forth for illustrative purposes and many other epoxy phosphate ester polymers and coating compositions are within the scope of the present invention.

A. Preparation of Epoxy Phosphate Ester Resin

Method I

To a suitable reactor equipped with a mechanical stirrer, temperature controller, condenser and addition funnel was charged epoxy resin(s) and ethylene glycol mono-butyl ether (50-80 weight % solution). The mixture was heated to 110° C. After the resin was dissolved, a solution (30-50 weight % concentration) of phosphoric acid in ethylene glycol mono-butyl ether was added, while maintaining the temperature below 115° C. (exotherm occurred during the addition). The resulting mixture was held at 120-135° C. for 1.5 hour. The mixture was cooled to 110° C. and deionized water (20 ml) was slowly added. The mixture was held at 116° C. for 2 hours. The resin solution was discharged after cooling down below 80° C.

Method II

To a suitable reactor equipped with a mechanical stirrer, temperature controller, condenser and addition funnel was charged epoxy resin(s) and ethylene glycol mono-butyl ether (50-80 weight % solution). The mixture was heated to 125° C. After the resin was dissolved, a solution (30-50 weight % concentration) of phosphoric acid in ethylene glycol mono-butyl ether was added, and maintained the temperature below 130° C. (exotherm occurred during the addition). The resulting mixture was held at 135-145° C. for 1.5 hour. The mixture was cooled to 110° C. and deionized water (20 ml) was slowly added. The mixture was held at 116° C. for 2 hours. The resin solution was discharged after cooling down below 80° C.

Method III

To a suitable reactor equipped with a mechanical stirrer, temperature controller, condenser and addition funnel was charged epoxy resin(s) and ethylene glycol mono-butyl ether (50-80 weight % solution). The mixture was heated to 110° C. After the resin was dissolved, a solution (30-50 weight % concentration) of phosphoric acid in ethylene glycol mono-butyl ether was added, and maintained the temperature at 120° C. (exotherm occurred during the addition). The resulting mixture was held at 135-145° C. for 1 hour. The mixture was cooled to 110° C. and deionized water (20 ml) was slowly added. The mixture was held at 116° C. for 2 hours. The resin solution was discharged after cooling down below 80° C.

Epoxy Phosphate Ester Resins 1-3 Prepared by Using Method I

Epoxy phosphate ester resin 1 DER 661 (trademark) (400 parts) in ethylene glycol mono-butyl ether (133 parts) was reacted with polyphosphoric acid (105%, 85.5 parts) to yield Epoxy phosphate ester resin 1.

Epoxy phosphate ester resin 2 EPON154 (trademark) (10 parts), EPON1004F (trademark) (130 parts), EPON1007F (60 parts) in ethylene glycol mono-butyl ether (67 parts) was reacted with polyphosphoric acid (105%, 6.6 parts) to yield Epoxy phosphate ester resin 2.

Epoxy phosphate ester resin 3 EPON1050 (trademark) (20 parts), EPON1004F (120 parts) and EPON1007F (60 parts) in ethylene glycol mono-butyl ether (67 parts) was reacted with polyphosphoric acid (105%, 16.7 parts) to yield Epoxy phosphate ester resin 3.

Epoxy Phosphate Ester Resins 4-7 Prepared by Using Method II

Epoxy phosphate ester resin 4 YD-014 (trademark) (400 parts) (400 parts) in ethylene glycol mono-butyl ether (133 parts) was reacted with polyphosphoric acid (105%, 69.3 parts) to yield Epoxy phosphate ester resin 4.

Epoxy phosphate ester resin 5 YD-017 (trademark) (400 parts) (400 parts) in ethylene glycol mono-butyl ether (133 parts) was reacted with polyphosphoric acid (105%, 7.2 parts) to yield Epoxy phosphate ester resin 5.

Epoxy phosphate ester resin 6 DER 661 (40 parts), DER 664 (240 parts) and DER 667 (60 parts) in ethylene glycol mono-butyl ether (133 parts) reacted with polyphosphoric acid (105%, 10.1 parts) to yield Epoxy phosphate ester resin 6.

Epoxy phosphate ester resin 7 DER 661 (40 parts), DER 664 (160 parts) and DER 667 (200 parts) in ethylene glycol mono-butyl ether (133 parts) reacted with polyphosphoric acid (105%, 9.3 parts) to yield Epoxy phosphate ester resin 7.

Epoxy Phosphate Ester Resins 8-11 Prepared by Using Method III

Epoxy phosphate ester resin 8 EPON1001F (380 parts), EPON1007F (20 parts) in ethylene glycol mono-butyl ether (133 parts) reacted with polyphosphoric acid (105%, 11.3 parts) to yield Epoxy phosphate ester resin 8.

Epoxy phosphate ester resin 9 EPON1004F (100 parts) and EPON1007F (100 parts) in ethylene glycol mono-butyl ether (67 parts) reacted with polyphosphoric acid (105%, 5.0 parts) to yield Epoxy phosphate ester resin 9.

Epoxy phosphate ester resin 10 EPON1001F (20 parts), EPON1004F (120 parts) and EPON1007F (60 parts) in ethylene glycol mono-butyl ether (67 parts) reacted with polyphosphoric acid (105%, 6.5 parts) to yield Epoxy phosphate ester resin 10.

Epoxy phosphate ester resin 11 EPON 826 (trademark) (40 parts), EPON1004F (120 parts) and EPON1007F (40 parts) in ethylene glycol mono-butyl ether (67 parts) reacted with polyphosphoric acid (105%, 12.5 parts) to yield Epoxy phosphate ester resin 11.

B. Preparation of Resin and Coating Emulsion

Testing Clear Spray Coating Formula

A standard clear spray coating formula was used to evaluate the resin emulsion properties. 174 parts of resin emulsion identified below, mixed with 15-25 parts of melamine resins (Cymel 325/373 from Cytec, or equivalent), 1-4 parts of a flow control resin (such as Coroc A-2678, from Cook Composites and Polymers Co. or Acrygen 4290 from Omnova Solutions Inc., respectively), 3-5 parts of high boiling-point water miscible solvents such as diethylene glycol mono-butyl ether, triethylene glycol mono-butyl ether, and the amount of deionized water was added then to adjust viscosity to 20-28" @ #2 Zahn cap, and NWW @ 24-30%.

Example 1

In a 500 mL cylindrical 3-neck Pyrex flask equipped with a mechanical stirrer, 50 parts of the resin 1 was charged, and basified with 5.1 parts of 2-amino-2-methyl-1-propanol (AMP-95 from the Dow Chemical Co.) in the mole ratio between acid and base equal to 0.85 to 1. After mixing for 15 minutes, deionized water was slowly introduced under high speed agitation. The water-in-oil phase failed to invert to oil-in-water even after more than 300 parts of water added.

Example 2

In a 500 mL cylindrical 3-neck Pyrex flask equipped with a mechanical stirrer, 81.71 parts of the resin 4 solution was blended with 4.42 parts of 2-amino-2-methyl-1-propanol (AMP-95 from the Dow Chemical Co.) and 88 parts of deionized water. Testing Clear Spray Coating Formula specified above was used for coating preparation.

Example 3

In a 500 mL cylindrical 3-neck pyrex flask equipped with a mechanical stirrer, 13.2 parts of the resin 5 was basified with 0.46 parts of 2-amino-2-methyl-1-propanol (AMP-95 from the Dow Chemical Co.) in a ratio between acid and base of 1 mol to 3 mol. After mixing for 15 min, 50 parts of deionized water was slowly introduced under high speed agitation. A dispersible milky emulsion was obtained with a small amount of seeds identified in the grind gauge.

Example 4

The resin 6 was basified with 30.6 parts of 2-amino-2-methyl-1-propanol (AMP-95 from The Dow Chemical Co.) in a ratio between acid and base equal to 1 mol to 3 mol. After it was stirred for 15 minutes, deionized water (700 ml) was continuously added over a period of 1 hour. The resin solution was discharged after additional 15 minutes of mixing. Testing Clear Spray Coating Formula specified above was used for coating preparation.

Example 5

The resin 7 was basified with 23.5 parts of 2-amino-2-methyl-1-propanol (AMP-95 from the Dow Chemical Co.) in a ratio between acid and base equal to 1 mol to 3 mol. After it was stirred for 15 minutes, deionized water (700 ml) was continuously added over a period of 1 hour. The resin solution was discharged after additional 15 minutes of mixing. Testing Clear Spray Coating Formula specified above was used for coating preparation.

Examples 6-11

The resins 2, 3, 8-11 were basified with 23.5 parts of 2-amino-2-methyl-1-propanol (AMP-95 from the Dow Chemical Co.) in a ratio between acid and base equal to 1 mol to 2.5 mol-3 mol. After it was stirred for 15 minutes, deionized water (300 ml-350 ml, with the exception of resin 8, in which that the amount used was 650 ml) was continuously added over a period of 1 hour. The resin solution was discharged after additional 15 minutes of mixing. Testing Clear Spray Coating Formula specified above was used for coating preparation, if applicable.

TABLE I

Summary of Emulsions and Coatings Stability

| Examples | Emulsion Stability Results | Coating Stability Results |
|---|---|---|
| 1 | Could not be inverted | N/A |
| 2 | Stable | Viscosity increased overnight, cannot be applied as it |
| 3 | Stable w/some seeds | N/A |
| 4 | Stable | Stable |
| 5 | Stable | Stable |
| 6 | Stable | Stable |
| 7 | Very high viscosity | N/A |
| 8 | Stable | Stable, but viscosity was very low |
| 9 | Separated upon standing | Stable |
| 10 | Very high viscosity | Stable |
| 11 | Very high viscosity | Can not be inverted |

Table II

Summary of Coatings Properties

A commercially available clear, water reducible, rust inhibitor was used in comparison with Examples (4, 5, and 6). Coatings were sprayed as supplied over untreated cold roll steel provided by Q-panel, and cure for 2'@ 325F.

|  | Rust Inhibitor | Example 4 | Example 5 | Example 6 |
|---|---|---|---|---|
| VOC (lb/gal) | 3.22 | 2.16 | 2.16 | 2.16 |
| Spray ability | Control | Similar to Control | Similar to Control | Slight Sag due to low viscosity |
| Odor, liquid | Moderate | Slight | Slight | Slight |
| Odor, in oven | Strong | Moderate | Moderate | Moderate |
| Liquid Appearance | Very Milky | Slight Less Milky | Milky | Much Less Milky |
| WPG | 8.38-8.58 | 8.60-8.80 | 8.60-8.80 | 8.60-8.80 |
| Fineness | 7 | 8+ | 8+ | 8+ |
| DFT | 0.05-0.30 | 0.05-0.60 | 0.05-0.50 | 0.05-0.45 |
| Gloss, 60 deg. | 60-70 | 95+ | 95+ | 95+ |
| Film Appearance | Slight Seedy | Smooth | Smooth | Smooth |
| Pencil Hardness | 4H-5H | 4H-5H | 4H-5H | 4H-5H |
| MEK DR | 50 DR - fail | 100 DR - pass | 100 DR - pass | 100 DR - pass |
| Reverse Impact | 160"/# fail 80"/# pass | 160"/# pass | 160"/# pass | 160"/# fail 80"/# pass |
| 10% Caustic Solution, 150 F | 4 hour - fail | 4 hour - pass | 4 hour - pass with some softening of film | 4 hour - pass |
| 10% EB in Water | 30 day - underline rust | 30 day - OK | 30 day - OK | 30 day - OK |

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the present invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A single-stage process for the preparation of water-dispersible epoxy phosphate ester polymer substantially free of phosphoric acid from a mixture of epoxy resins selected from a group comprising diglycidyl ethers of bisphenols and having an average of greater than 1.5 epoxy groups and having one or more epoxy resins that is/are different in grade and/or type than at least one other epoxy resin in said mixture of epoxy resins, wherein each grade and/or type of epoxy resin has an average weight per epoxide equivalent (WPE) that is different from each other grade and/or type of epoxy resin in said mixture of epoxy resins, which comprises the step of:

reacting said mixture of epoxy resins with a phosphoric acid source material, selected from a group comprising orthophosphoric acid, phosphoric acid, polyphosphoric acid, superphosphoric acid, and other condensed forms of phosphoric acid.

2. The process in accordance with claim 1 wherein said epoxy resins used in the production of said epoxy phosphate ester polymers, are epoxy resins having the general structure:

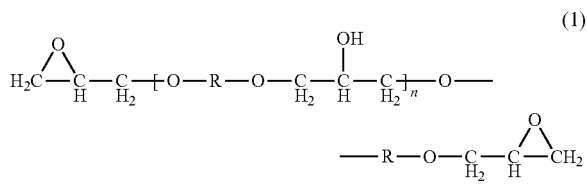

and R represents a bisphenol residue,
and n is from 0 to 30.

3. The process in accordance with claim 2, wherein the mixture of epoxy resins are at least two or more epoxy resins of the general structure (1) and (2), each epoxy resin consisting of between 1 to 99 weight percent of the epoxy polymers.

4. The process in accordance with claim 2, wherein the epoxy polymer is prepared by mixing at least two different epoxy resins.

5. The process in accordance with claim 1, wherein the phosphoric acid source material is used in an amount of from about 0.1-1 equivalent of phosphoric acid per equivalent of epoxy resin.

6. A water-borne coating composition comprising:
(a) the epoxy phosphate ester resin polymer of claim 1;
(b) at least one curing agent; and
(c) water.

7. The coating composition in accordance with claim 6, further comprising an organic solvent.

8. The process in accordance with claim 1, further including the step of neutralizing the epoxy phosphate ester polymer with one or more organic amines selected from a group comprising aliphatic mono- and polyfunctional amines, choline, guanidine, cycloaliphatic amines, aromatic amines, heterocylic amines and alkyl alcohol amines.

9. The process in accordance with claim 8, wherein the organic amine is 2-amino-2-methyl-1-propanol.

10. The single-stage process in accordance with claim 1, wherein the reacting step is carried out between 50° C. to 200° C. for a period of time between ½ to 6 hours.

11. A single-stage process for the preparation of water-dispersible epoxy phosphate ester polymers from at least two grades and/or types of epoxy resins selected from a group comprising diglycidyl ethers of bisphenols, with each grade and/or type of epoxy resin having an average of greater than 1.5 epoxy groups and which may possess a different epoxy per weight equivalent (WPE) for each grade and/or type of epoxy resin, which comprises the step of:

reacting said each grade and/or type of epoxy resin with a phosphoric acid source material selected from a group comprising orthophosphiric acid, phosphoric acid, polyphosphoric acid, superphosphoric acid, and other condensed forms of phosphoric acid at a strength of about 0.01-1 equivalent of phosphoric acid per equivalent of epoxy group to form the water-dispersible epoxy phosphate ester polymers substantially free of phosphoric acid, diesters and triesters of epoxy phosphate resins.

12. The process in accordance with claim 11, wherein said each grade and/or type of epoxy resin which is used in the production of said water-dispersible epoxy phosphate ester polymer is selected from a group comprising a glycidyl ether of bisphenol A, a glycidyl ether of bisphenol K, a glycidyl ether of bisphenol F, a glycidyl ether of bisphenol S, and other glycidyl ethers of bisphenols having a molecular weight between 340 and 10,000.

13. The process in accordance with claim 11, wherein said at least two grades and/or types of epoxy resin are epoxy resins having the general structure:

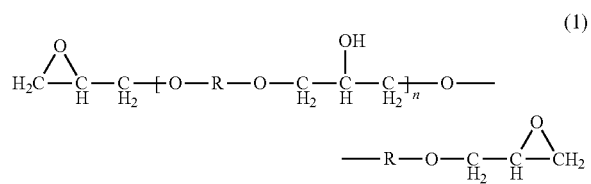

and R represents a bisphenol residue,
and n is from 0 to 30.

14. The process in accordance with claim 13, wherein the epoxy polymers are prepared by mixing at least two different epoxy resin polymers.

15. The process in accordance with claim 11, further including the step of neutralizing the epoxy phosphate ester polymer with one or more organic amines selected from a group comprising aliphatic mono- and polyfunctional amines, choline, guanidine, cycloaliphatic amines, aromatic amines, heterocylic amines and alkyl alcohol amines.

16. The process in accordance with claim 15, wherein the organic amine is 2-amino-2-methyl-1-propanol.

17. The process in accordance with claim 15, further including the step of adding water to the neutralized epoxy phosphate ester polymer.

18. The single-stage process in accordance with claim 11, wherein the reacting step is carried out between 50° C. to 200° C. for a period of time between ½ to 6 hours.

* * * * *